(12) United States Patent
Idicheria et al.

(10) Patent No.: US 10,626,812 B2
(45) Date of Patent: Apr. 21, 2020

(54) INTERNAL COMBUSTION ENGINE EMPLOYING A DEDICATED-CYLINDER EGR SYSTEM

(71) Applicant: GM GLOBAL TECHNOLOGY OPERATIONS LLC, Detroit, MI (US)

(72) Inventors: Cherian A. Idicheria, Novi, MI (US); Edward J. Keating, Ortonville, MI (US); Paul M. Najt, Bloomfield Hills, MI (US); Richard S. Davis, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 99 days.

(21) Appl. No.: 15/423,051

(22) Filed: Feb. 2, 2017

(65) Prior Publication Data

US 2018/0216550 A1 Aug. 2, 2018

(51) Int. Cl.
*F02D 41/00* (2006.01)
*F02D 41/30* (2006.01)
(Continued)

(52) U.S. Cl.
CPC .......... *F02D 41/0077* (2013.01); *F02B 75/20* (2013.01); *F02D 37/02* (2013.01); *F02D 41/005* (2013.01); *F02D 41/0082* (2013.01); *F02D 41/1454* (2013.01); *F02D 41/1475* (2013.01); *F02D 41/26* (2013.01); *F02D 41/3005* (2013.01); *F02M 26/14* (2016.02); *F02M 26/41* (2016.02); *F02M 26/43* (2016.02); *F02P 9/007* (2013.01); *F02P 23/04* (2013.01); *F02B 75/22* (2013.01); *F02D 13/0261* (2013.01); *F02D 41/006* (2013.01); *F02D 2041/001* (2013.01); *F02D 2200/101* (2013.01);
(Continued)

(58) Field of Classification Search
CPC ........ F02M 26/13; F02M 26/41; F02M 26/14; F02M 26/16; F02M 26/43; F02M 26/42; F02M 26/44; F02M 26/05; F02D 41/0077; F02D 37/02; F02D 41/1454; F02D 41/26; F02D 41/3005; F02D 2200/101; F02D 41/005; F02D 41/1475; F02D 41/0082; F02D 2200/1002; F02D 2041/001; F02D 13/0261; F02D 41/006; F02D 21/08; F02B 75/20; F02B 75/22; F02P 23/04; F02P 9/007; F02P 23/045; F02P 15/08
USPC ........................................................ 701/104
See application file for complete search history.

(56) References Cited

U.S. PATENT DOCUMENTS

| | | | | |
|---|---|---|---|---|
| 4,124,003 A | * | 11/1978 | Abe ........................ | F02B 17/00 123/169 EL |
| 5,802,846 A | * | 9/1998 | Bailey ...................... | F01N 3/02 123/568.12 |

(Continued)

*Primary Examiner* — Phutthiwat Wongwian
*Assistant Examiner* — Susan E Scharpf
(74) *Attorney, Agent, or Firm* — Quinn IP Law

(57) ABSTRACT

A multi-cylinder engine includes first and second subsets of cylinders. A dedicated-cylinder exhaust gas recirculation (EGR) system is associated with the second subset of cylinders. A plasma ignition system is disposed in the second subset of cylinders. A controller operates the plasma ignition system to control the plasma igniters to execute plasma discharges in the second subset of cylinders to generate residual exhaust gas, which is recirculated through the dedicated-cylinder EGR system to the intake air system for introduction into intake air.

20 Claims, 2 Drawing Sheets

(51) Int. Cl.
  *F02P 9/00* (2006.01)
  *F02D 41/14* (2006.01)
  *F02M 26/43* (2016.01)
  *F02M 26/14* (2016.01)
  *F02M 26/41* (2016.01)
  *F02B 75/20* (2006.01)
  *F02D 37/02* (2006.01)
  *F02D 41/26* (2006.01)
  *F02P 23/04* (2006.01)
  *F02D 13/02* (2006.01)
  *F02M 26/05* (2016.01)
  *F02B 75/22* (2006.01)

(52) U.S. Cl.
  CPC ..... *F02D 2200/1002* (2013.01); *F02M 26/05* (2016.02); *F02P 23/045* (2013.01)

(56) References Cited

U.S. PATENT DOCUMENTS

| | | | |
|---|---|---|---|
| 6,286,489 B1* | 9/2001 | Bailey | F02D 41/0047 |
| | | | 123/568.11 |
| 6,877,492 B1* | 4/2005 | Osterwald | F02B 29/0437 |
| | | | 123/568.11 |
| 7,444,815 B2* | 11/2008 | Baumgard | F02B 37/24 |
| | | | 60/605.2 |
| 8,291,891 B2 | 10/2012 | Alger, II et al. | |
| 8,464,695 B2* | 6/2013 | Ikeda | B01D 53/32 |
| | | | 123/143 B |
| 8,561,599 B2 | 10/2013 | Gingrich et al. | |
| 9,322,376 B2 | 4/2016 | Ikeda et al. | |
| 9,631,582 B2* | 4/2017 | Geckler | F02D 41/0065 |
| 2007/0137611 A1* | 6/2007 | Yu | F02D 41/3047 |
| | | | 123/304 |
| 2009/0308070 A1* | 12/2009 | Alger, II | F02D 13/0238 |
| | | | 60/602 |
| 2012/0204844 A1* | 8/2012 | Gingrich | F02B 27/0215 |
| | | | 123/568.11 |
| 2013/0199508 A1* | 8/2013 | Toedter | F02P 23/04 |
| | | | 123/594 |
| 2014/0202433 A1* | 7/2014 | Dane | F02D 41/0065 |
| | | | 123/568.11 |
| 2014/0261322 A1* | 9/2014 | Geckler | F02D 41/0065 |
| | | | 123/445 |
| 2014/0360461 A1* | 12/2014 | Ulrey | F02M 26/43 |
| | | | 123/299 |
| 2015/0114341 A1* | 4/2015 | Geckler | F02D 41/0065 |
| | | | 123/295 |
| 2015/0240706 A1* | 8/2015 | Yamagata | F02D 21/08 |
| | | | 60/603 |
| 2015/0354476 A1* | 12/2015 | Ge | F02D 41/0002 |
| | | | 60/274 |
| 2015/0377206 A1* | 12/2015 | Idicheria | F02D 41/402 |
| | | | 123/299 |
| 2016/0017783 A1* | 1/2016 | Keating | F01N 3/2033 |
| | | | 60/605.2 |
| 2016/0040589 A1* | 2/2016 | Glugla | F02D 41/0082 |
| | | | 60/278 |
| 2017/0175614 A1* | 6/2017 | Kolhouse | F02D 41/008 |
| 2017/0204797 A1* | 7/2017 | Geckler | F02D 41/0065 |
| 2018/0135506 A1* | 5/2018 | Grover, Jr. | F02B 19/12 |
| 2018/0216550 A1* | 8/2018 | Idicheria | F02B 75/20 |

* cited by examiner

INTERNAL COMBUSTION ENGINE EMPLOYING A DEDICATED-CYLINDER EGR SYSTEM

INTRODUCTION

Internal combustion engines (engines) produce mechanical power in the form of torque and rotational speed by combusting a mixture of air and fuel within one or more combustion chambers. During combustion, various exhaust gases are produced. A portion of the exhaust gas can be recirculated back into the engine cylinders, e.g., via an exhaust gas recirculation system. The recirculated exhaust gas can displace an amount of combustible mixture in the cylinder, thus diluting a cylinder charge and causing increased engine efficiency and lower combustion temperatures, which may serve to reduce formation of certain gaseous byproducts. Magnitude of the dilution may affect and is thus limited by combustion stability.

SUMMARY

A multi-cylinder internal combustion engine system (engine) is described, and includes an engine subassembly including an engine block defining a plurality of cylinders including a first subset of cylinders, a second subset of cylinders, and an air intake system. A first exhaust manifold is disposed to entrain exhaust gas from a first subset of the cylinders and a second exhaust manifold is disposed to entrain exhaust gas from a second subset of the cylinders. A dedicated-cylinder exhaust gas recirculation (EGR) system associated with the second subset of cylinders includes a runner fluidly connected between the second exhaust manifold and the air intake system. A plasma ignition system is disposed in the second subset of cylinders, wherein each of the plasma igniters has a tip portion that is disposed in one of the second subset of cylinders. A controller is operatively connected to the internal combustion engine including the plasma ignition system. The controller includes an instruction set that is executable to operate the plasma ignition system to control the plasma igniters to execute plasma discharges in the second subset of cylinders to generate residual exhaust gas.

An aspect of the disclosure includes a method for operating the engine that includes generating cylinder charges in the first subset of cylinders and in the second subset of cylinders including employing intake air that is introduced into the air intake system. The plasma ignition system executes plasma discharge to combust the cylinder charges in the second subset of cylinders to generate the residual exhaust gas, which is recirculated from the second subset of cylinders through the dedicated-cylinder EGR system to the intake air system for introduction into the intake air.

Another aspect of the disclosure includes the engine further including a diverter valve that is disposed to control flow of the residual exhaust gas that are supplied from the second subset of cylinders. Operation of the engine includes determining an engine speed/load operating point, and controlling the diverter valve to channel the residual exhaust gas through the dedicated-cylinder EGR system to the air intake system for incorporation into the intake air when the engine speed/load operating point is associated with a speed/load operating region at which the engine is able to operate at an acceptable level of combustion stability.

Another aspect of the disclosure includes controlling the diverter valve to channel the residual exhaust gas away from the dedicated-cylinder EGR system when the engine speed/load operating point is not associated with a speed/load operating region at which the engine is able to operate at an acceptable level of combustion stability.

An aspect of the disclosure includes injecting fuel, via a fuel injection system, to form cylinder charges in the first subset of cylinders that are lean of stoichiometry.

Another aspect of the disclosure includes injecting fuel, via the fuel injection system, to form the cylinder charges in the second subset of cylinders that are rich of stoichiometry.

Another aspect of the disclosure includes executing, via the plasma ignition system, plasma discharges to combust the cylinder charges in the first subset of cylinders.

Another aspect of the disclosure includes executing, via the plasma ignition system, plasma discharges to combust the cylinder charges in the second subset of cylinders to generate radicals in the residual exhaust gas.

Another aspect of the disclosure includes the engine subassembly arranged in an in-line cylinder configuration, wherein the second subset of the cylinders includes a single one of the cylinders.

Another aspect of the disclosure includes the engine subassembly arranged in an in-line cylinder configuration, wherein the second subset of the cylinders includes a plurality of the cylinders.

Another aspect of the disclosure includes the in-line cylinder configuration including one of a three-cylinder in-line configuration, a four-cylinder in-line configuration, a five-cylinder in-line configuration or a six-cylinder in-line configuration.

Another aspect of the disclosure includes the engine subassembly arranged in a V-configuration including a first bank of cylinders and a second bank of cylinders, wherein the second subset of the cylinders includes a single one of the cylinders on each of the first and second banks of cylinders.

Another aspect of the disclosure includes the engine subassembly arranged in a V-configuration including a first bank of cylinders and a second bank of cylinders, wherein the second subset of the cylinders includes all of the cylinders on one of the first or second banks of cylinders.

Another aspect of the disclosure includes the V-configuration including one of a V6 configuration, a V8 configuration, a V-10 configuration or a V-12 configuration.

Another aspect of the disclosure includes plasma igniter being configured as a barrier-discharge device, a groundless barrier-discharge device, or a corona discharge plasma igniter.

Another aspect of the disclosure includes the plasma ignition system including a plurality of plasma igniters that are disposed in the first subset of the cylinders, wherein each of the plasma igniters has a tip portion that is disposed in one of the first subset of cylinders.

Another aspect of the disclosure includes the intake manifold having a first throttle that is disposed to control intake airflow to the first and second subsets of the cylinders and a second throttle that is disposed to control intake airflow to only the second subset of the cylinders.

These and other aspects of the disclosure are described herein.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some or all of these details. Moreover, for the purpose of clarity, certain technical material in the related art has not been described in detail in order to avoid unnecessarily obscuring the disclosure. Furthermore, the drawings are in simplified form and are not to precise scale. Use of directional terms may not be construed to limit the scope of the disclosure. Furthermore, the disclosure, as illustrated and described herein, may be practiced in the absence of an element that is not specifically disclosed herein. Furthermore, the teachings may be described herein in terms of functional and/or logical block components and/or various processing steps. It should be realized that such block components may be composed of hardware, software, and/or firmware components configured to perform the specified functions. As employed herein, the term "upstream" and related terms refer to elements that are towards an origination of a flow stream relative to an indicated location, and the term "downstream" and related terms refer to elements that are away from an origination of a flow stream relative to an indicated location.

Figure 1:
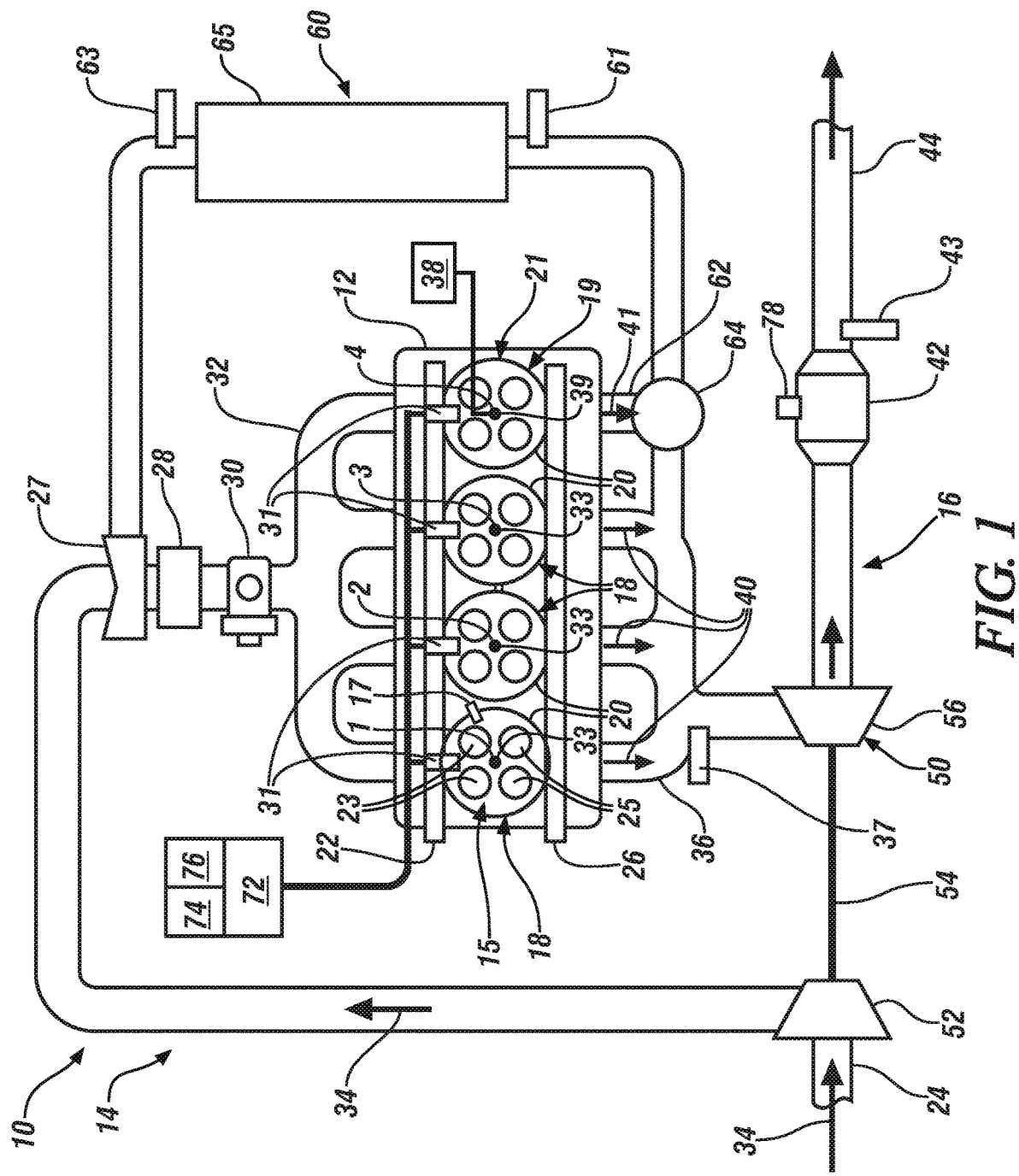
FIG. 1 schematically shows an embodiment of a four-cylinder internal combustion engine including an engine subassembly having a first subset of cylinders and a second subset of cylinders, with a plasma ignition system disposed in the second subset of cylinders, wherein the second subset of cylinders is associated with a dedicated-cylinder exhaust gas recirculation (EGR) system, in accordance with the disclosure.

Referring now to the drawings, wherein the depictions are for the purpose of illustrating certain exemplary embodiments and not for the purpose of limiting the same, FIG. 1 schematically illustrates an embodiment of a multi-cylinder four-cycle internal combustion engine assembly (engine) 10 including an engine subassembly 12 having a first subset of cylinders 18 and a second subset of cylinders 19, wherein the second subset of cylinders 19 is associated with a dedicated-cylinder exhaust gas recirculation (EGR) system 60. The first and second subsets of cylinders are 18, 19 mutually exclusive. Each of the cylinders associated with the second subset of cylinders 19 includes a plasma igniter 39 that is controlled by a plasma ignition system 38. The engine 10 also includes an air intake system 14 and an exhaust system 16. A controller 72 is disposed to control operation of the engine 10 including controlling operation of the plasma ignition system 38. In one embodiment and as shown, a turbocharger 50 may be employed. Alternatively, an engine-driven or electric motor-driven supercharger may be employed. The engine 10 may be deployed on a vehicle to provide propulsion power, wherein the vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The engine 10 is preferably configured as a high-compression-ratio internal combustion engine, and may also include another suitable internal combustion engine that combusts hydrocarbon fuels to generate torque. The engine subassembly 12 preferably includes an engine block defining a plurality of cylinders 20 (referenced as cylinders 1-4), a corresponding plurality of pistons that reciprocate within the cylinders 20, a rotatable crankshaft that couples to the pistons, a cylinder head 21, and other engine components such as piston connecting rods, pins, bearings and the like. Each of the cylinders 20 with corresponding piston and portion of the cylinder head 21 defines a variable-volume combustion chamber 15. Each of the plurality of cylinders 20 selectively fluidly communicates with the air intake system 14 via intake valves 23, respectively, to receive fresh/oxygenated air, and each of the plurality of cylinders 20 selectively fluidly communicates with the exhaust system 16 via exhaust valves 25 to expel the byproducts of combustion.

The air intake system 14 and the exhaust system 16 can be in mechanical communication through the turbocharger 50. The turbocharger 50 is in fluid communication with the exhaust system 16, which expels the first exhaust product 40. The turbocharger 50 can include a turbine 56 in fluid communication with the exhaust system 16 and a compressor 52 in fluid communication with the air intake system 14. The turbine 56 and the compressor 52 can be mechanically coupled via a rotatable shaft 54. The turbocharger 50 can utilize the energy of the first exhaust product 40 flowing from the engine 10 to spin the turbine 56 and the compressor 52. The rotation of the compressor 52 draws fresh air 34 in through a fresh air inlet 24 and compresses the air 34 into the remainder of the air intake system 14. The first exhaust product 40 is expelled through the turbocharger 50 and flows toward an aftertreatment device 42.

In this embodiment, the engine 10 is a four-cylinder engine wherein the first subset of cylinders 18 includes cylinders 1, 2 and 3 and the second subset of cylinders 19 includes cylinder 4. While the illustrated engine 10 depicts an inline 4-cylinder (I4) engine configuration, the present technology is equally applicable to other engine configurations, including, by way of non-limiting examples, I2, I3, I5 and I6 engine configurations, or V-2, V-4, V-6, V-8, V-10, and V-12 engine configurations, among others. The quantity of cylinders included in the first subset of cylinders 18 and the quantity of cylinders included in the second subset of cylinders 19 defines the dilution level for the specific engine configuration, and is application-specific. The ratio of the quantities of cylinders in the first and second subsets of cylinders 18, 19 defines the dilution level. A three-cylinder engine having one dedicated-EGR cylinder has a 33% dilution level. A four-cylinder engine having one dedicated-EGR cylinder has a 25% dilution level, whereas a four-cylinder engine having two dedicated-EGR cylinders has a 50% dilution level. A V engine configuration may be configured with one or more cylinders in each bank included in the second subset of cylinders 19, or alternatively, all of the cylinders in one of the banks in a V engine configuration may be included in the second subset of cylinders 19.

The cylinder head 21 includes a plurality of intake ports and associated intake valves 23, respectively, for each of the cylinders 20, a plurality of exhaust ports and associated exhaust valves 25 for each of the cylinders 20, and other ports and associated components including fuel injectors 31, first combustion igniters 33 that are associated with the first subset 18 of the cylinders 20, and the plasma igniters 39 that are associated with the second subset 19 of the cylinders 20. The fuel injectors 31 may be direct-injection devices in one embodiment. Alternatively, the fuel injectors 31 may be port-injection devices. The first combustion igniters 33 may be configured as spark plugs with an associated spark-ignition system (not shown) that is in communication with the controller 72 in one embodiment. Alternatively, the first combustion igniters 33 may be configured as plasma igniters that are in communication with and controlled by the plasma ignition system 38, which is in communication with the controller 72.

The term "dedicated-cylinder EGR system" as employed herein refers to a system in which all residual exhaust gas 41 that is generated in one or a plurality of the cylinders 20, e.g., the second subset 19 of the cylinders 20, is segregated and routed to the air intake system 14. The exhaust system 16 preferably includes a first exhaust manifold 36 and a second exhaust manifold 62 that are disposed to entrain and direct exhaust gases that are expelled from the engine 10 via openings of the exhaust valves 25. In one embodiment, the dedicated-cylinder EGR system 60 includes the second exhaust manifold 62 and an in-stream EGR heat exchanger 65 that fluidly connects to the air intake system 14 at an EGR mixer 27 that is located upstream of a charge air cooler 28 and a throttle 30, and thus is disposed to channel the residual exhaust gas 41 from the second subset 19 of the cylinders 20 to the air intake system 14 for incorporation with the intake air to form cylinder charges. The second exhaust manifold 62 entrains exhaust gas flow from the second subset 19 of the cylinders 20, i.e., cylinder 4 in this embodiment, and channels this residual exhaust gas 41 to the air intake system 14. In one embodiment, a second throttle (not shown) is disposed in a portion of the intake manifold 32 to control airflow to the second subset 19 of the cylinders 20. In one embodiment (not shown), the intake manifold 32 is fluidly coupled to the air intake system 14 to distribute the mixture of the intake air and the residual exhaust gas 41 to the first subset 18 of cylinders 20, and there is a separate, naturally-aspirated intake air system that is disposed to supply intake air to the second subset 19 of the cylinders 20. Other elements preferably include the in-stream EGR heat exchanger 65 that is configured to reduce or otherwise manage temperature of the residual exhaust gas 41, a first temperature sensor 61 that is disposed to monitor temperature of the residual exhaust gas 41 upstream of the in-stream EGR heat exchanger 65 and a second temperature sensor 63 that is disposed to monitor temperature of the residual exhaust gas 41 downstream of the in-stream EGR heat exchanger 65. Thus, the dedicated-cylinder EGR system 60 fluidly communicates with the air intake system 14 to route the residual exhaust gas 41 from the second subset 19 of the cylinders 20 to the air intake system 14. This residual exhaust gas 41 can mix with the fresh air 34 within the EGR mixer 27 to dilute the oxygen content of the intake air charge. In one embodiment of the engine 10 employing the dedicated-cylinder EGR system 60, the magnitude of EGR dilution of the intake air charge is approximately a ratio of the number of dedicated EGR cylinders to the total number of cylinders. In FIG. 1, the second subset 19 of the cylinders 20 supplies residual exhaust gas 41 for recirculation into the intake manifold 32 of the engine 12, causing EGR dilution level of approximately 25%. The use of the dedicated-cylinder EGR system 60 can increase fuel efficiency in spark-ignition engines. Furthermore, the dedicated-cylinder EGR system 60 can reduce the combustion temperature and emission production from the engine 10. The first exhaust product 40 is produced by the first subset 18 of the cylinders 20, i.e., cylinders 1-3 in this embodiment and is expelled from the engine 10 via the exhaust system 16 through the aftertreatment device 42.

The plasma igniter 39 may be configured as a corona discharge igniter, a dielectric barrier discharge igniter, groundless dielectric barrier-discharge igniter, or another suitable plasma ignition device that can be disposed in-cylinder to effect ignition of a fuel/air cylinder charge. In one embodiment, the plasma ignition system 38 is controlled to generate a high-energy, high frequency electrical field that is communicated to the plasma igniter 39 to produce repeatable, controlled ionization in-cylinder, which operates to generate ion streams that ignite the cylinder charge. When the plasma igniter 39 is configured as a dielectric barrier-discharge igniter, a positive electrode is encased in a dielectric material and is surrounded by a ground electrode along its length, with a tip portion exposed into the combustion chamber. Multiple streamers discharge between the dielectric material and the ground electrode to ignite the cylinder charge. When the plasma igniter 39 is configured as a groundless dielectric barrier-discharge igniter, a positive electrode is encased in a dielectric material without a negative electrode, with a tip portion exposed into the combustion chamber. Multiple streamers discharge along the surface of the positive electrode to ignite the cylinder charge. As used herein, the term "groundless" indicates absence of a discrete element or structure proximal to the plasma igniter 39 that would be capable of electrically coupling to an electrical ground path. When the plasma igniter 39 is configured as a corona discharge igniter, the tip portion includes an electric prong that generates streamer discharges that propagate into the combustion chamber. The plasma ignition system 38 and plasma igniter 39 are employed as a substitute for a spark-ignition module and spark plug.

The air intake system 14 can generally include one or more of a fresh-air inlet, the EGR mixer 27, the charge air cooler 28, the throttle 30 and the intake manifold 32. During operation of the engine 10, fresh air or intake air 34 can be ingested by the air intake system 14 from the atmosphere through an associated air-cleaner assembly via the fresh-air inlet. The throttle 30 can include a controllable baffle that is configured to regulate the total flow of intake air through the air intake system 14, and ultimately into the cylinders 20 via the intake manifold 32. Intake airflow from the intake manifold 32 into each of the cylinders 20 is controlled by the intake valves 23, the activation of which may be controlled by an intake valve activation system 22. Exhaust flow out of each of the cylinders 20 to the first and second exhaust manifolds 36, 62 is controlled by the exhaust valve(s) 25, the activation of which may be controlled by an exhaust valve activation system 26.

The intake valves 23 are disposed between the air intake system 14 and a corresponding one of the cylinders 20. The exhaust valves 25 are disposed between a corresponding one of the cylinders 20 and the exhaust system 16. In one embodiment, and as shown, the second exhaust manifold 62 fluidly couples to a diverter valve 64 that includes an inlet pipe from the second subset 19 of the cylinders 20, i.e., cylinder 4 in this embodiment. The diverter valve 64 includes a first outlet pipe that fluidly couples to the dedicated-cylinder EGR system 60, and a second outlet pipe that fluidly couples to the first exhaust manifold 36. The diverter valve 64 is in communication with the controller 72, and is controllable to control flow of residual exhaust gas 41 from the second subset 19 of the cylinders 20, i.e., cylinder 4 in this embodiment to either the first exhaust manifold 36 or the dedicated-cylinder EGR system 60. The intake valve activation system 22 preferably includes a rotatable camshaft whose rotation is indexed to rotation of the crankshaft. In one embodiment, the intake valve activation system 22 may be variably controlled. The exhaust valve activation system 26 preferably includes a rotatable camshaft whose rotation is indexed to rotation of the crankshaft. In one embodiment, the exhaust valve activation system 26 may be variably controlled, as described herein. In one embodiment, the intake valve activation system 22 may include a variable camshaft phaser (VCP) and/or a variable lift control (VLC) device that interacts with the exhaust camshaft(s) to control the openings and closings of the intake valves 23. In one embodiment, the exhaust valve activation system 26 may include a variable camshaft phaser (VCP) and/or a variable lift control (VLC) device that interacts with the exhaust camshaft(s) to control the openings and closings of the exhaust valves 25. Controlling the openings and closings of the intake valves 23 and the exhaust valves 25 can include controlling magnitude of valve lift and/or controlling phasing, duration or timing of valve openings and closings. The exhaust valve activation system 26 including the VCP/VLC device is disposed to control interactions between the exhaust valves 25 and an exhaust camshaft in one embodiment. Alternatively, the exhaust valves 25 interact directly or via followers with an exhaust camshaft. The rotations of the intake and exhaust camshafts are linked to and indexed, variably in the case of VCP application, to rotation of the engine crankshaft, thus linking openings and closings of the intake and exhaust valves 23, 25 to positions of the crankshaft and the pistons housed in the cylinders 20. On embodiments so equipped, the intake valve activation system 22 includes mechanisms and control routines that interact with the intake camshaft(s) to control the openings and closings of the intake valves 23, including selectively deactivating one or both of the intake valves 23. One mechanization that may be configured to individually selectively deactivate one or both of the intake valves 23 includes stationary hydraulic lash adjusters (SHLA) and roller finger followers (RFF). Another mechanization that may be configured to individually selectively deactivate one or both of the intake valves 23 includes an intake camshaft and related componentry that includes a sliding cam having multiple cam lobes that may be selectively disposed to interact with and control openings and closings of one or both of the intake valves 23.

Reciprocating movement of each of the pistons in its corresponding cylinder is between a piston bottom-dead-center (BDC) location and a piston top-dead-center (TDC) location in concert with rotation of the crankshaft. Engines operating with a four-stroke engine cycle sequentially execute a repeated pattern of intake, compression, power and exhaust strokes. During the compression stroke, a fuel/air cylinder charge in the combustion chamber 15 is compressed by rotation of the crankshaft and movement of the piston in preparation for ignition. The intake valve 23 and the exhaust valve 25 are closed during at least a portion of the compression stroke. Closing of the intake valve 23 can be controlled by controlling the intake valve activation system 22, resulting in controlling an effective compression ratio. The effective compression ratio is defined as a ratio of a volumetric displacement of the combustion chamber 15 at closing of the intake valve 23 and a minimum volumetric displacement of the combustion chamber 15, e.g., when the piston is at TDC. The effective compression ratio may differ from a geometric compression ratio, which is defined as a ratio of a maximum volumetric displacement of the combustion chamber 15 occurring at BDC and the minimum volumetric displacement of the combustion chamber 15 occurring at TDC without regard to closing time of the intake valve 23. An early or delayed closing of the intake valve 23 may trap less air in the combustion chamber 15, thus decreasing pressure and therefore decreasing temperature in the combustion chamber 15 during combustion. In one embodiment, fuel is metered and injected into the combustion chamber 15 during the intake stroke. One fuel injection event may be executed to inject fuel; however, multiple fuel injection events may be executed. In one embodiment, fuel is injected early enough in the intake stroke to allow adequate premixing of the fuel/air cylinder charge in the combustion chamber 15.

Referring again to FIG. 1, the charge air cooler 28 can be disposed between the EGR mixer 27 and the throttle 30. In general, the charge air cooler 28 can be a radiator-style heat exchanger that uses a flow of atmospheric air or liquid coolant to cool an intake air charge that is a mixture of fresh air and recirculated exhaust gas. As may be appreciated, the intake air charge can be warmer than atmospheric temperature due to the pressurization via the compressor 52, in conjunction with the mixing of the higher temperature residual exhaust gas 41. The charge air cooler 28 can cool the gas mixture to increase its density/volumetric efficiency, while also reducing the potential for abnormal combustion such as pre-ignition or knock.

The exhaust gas passes through the aftertreatment device 42, which is configured to catalyze, reduce and/or remove exhaust gas constituents prior to exiting the exhaust system 16 via a tailpipe 44. The aftertreatment device 42 can include one or combinations of catalytic devices, including, e.g., a three-way catalytic device, an oxidation catalyst, a hydrocarbon trap, a NOx adsorber, a particulate filter or other suitable components and accompanying pipes and valves that function to oxidize, reduce, and otherwise catalyze and/or remove various exhaust gas constituents prior to exiting the exhaust system 16.

Operation of the engine 10 can be monitored by a plurality of sensing devices. By way of non-limiting examples, the sensing devices may include a combustion sensor 17 that is disposed to monitor an engine parameter that is associated with combustion in each cylinder 20, a first exhaust gas sensor 37 that is disposed in the first exhaust manifold 36, a second exhaust gas sensor 43 that is disposed in the exhaust gas feedstream downstream of the aftertreatment device 42, a temperature sensor 78 that is disposed to monitor temperature of the aftertreatment device 42, the first temperature sensor 61 that is disposed to monitor temperature of recirculated exhaust gas upstream of the in-stream EGR heat exchanger 65 and the second temperature sensor 63 that is disposed to monitor temperature of recirculated exhaust gas downstream of the in-stream EGR heat exchanger 65.

The combustion sensor 17 may be disposed to monitor an engine parameter associated with combustion in each of the cylinders 20, from which a measure of combustion stability may be determined. In one embodiment, the combustion sensor 17 may be in the form of an in-cylinder pressure sensor, and the combustion stability parameter may be in the form of a coefficient of variation of a mean-effective pressure, or COV-IMEP). A single combustion sensor 17 that is disposed to monitor cylinder 1 is shown for ease of illustration. It is appreciated that there may be combustion sensors associated with each of the cylinders of the engine 10. Alternatively, the combustion sensor 17 may be in the form of a rotational speed sensor that is disposed to monitor rotational speed and position of the crankshaft, with accompanying algorithms to evaluate crankshaft speed variations, or another suitable combustion monitoring sensor. The aforementioned sensors are provided for purposes of illustration. Each of the aforementioned sensors may be replaced by other sensing devices that monitor a parameter associated with operation of the engine 10, or may instead be replaced by an executable model to derive a state of an engine operating parameter from which a measure of combustion stability may be determined.

The controller 72 may be in the form of an electronic control module that is in communication with various components of the vehicle. The controller 72 includes a processor 74 and a memory 76 on which is recorded instructions for communicating with the plasma ignition system 38, the intake valve activation system 22, the turbocharger 50, the aftertreatment device 42, etc. The controller 72 is configured to execute instructions that are stored in the memory 76 via the processor 74. For example, the controller 72 can be a host machine or distributed system, e.g., a computer such as a digital computer or microcomputer, acting as a vehicle control module, and/or as a proportional-integral-derivative (PID) controller device having a processor, and, as the memory 76, tangible, non-transitory computer-readable memory such as read-only memory (ROM) or flash memory. The controller 72 can also have random access memory (RAM), electrically erasable programmable read only memory (EEPROM), a high-speed clock, analog-to-digital (A/D) and/or digital-to-analog (D/A) circuitry, and required input/output circuitry and associated devices, as well as required signal conditioning and/or signal buffering circuitry. Therefore, the controller 72 can include all software, hardware, memory devices, e.g., memory 76, algorithms, calibrations, connections, sensors, etc., to monitor and control various actuators that are disposed on the engine 10. As such, a control method can be embodied as software or firmware associated with the controller 72. It is to be appreciated that the controller 72 can also include device(s) capable of analyzing data from various sensors, comparing data, making decisions for monitoring and controlling the engine 10.

Communication between controllers, and communication between controllers, actuators and/or sensors may be accomplished using a direct wired link, a networked communications bus link, a wireless link or another suitable communications link. Communication includes exchanging data signals in suitable form, including, for example, electrical signals via a conductive medium, electromagnetic signals via air, optical signals via optical waveguides, and the like.

The engine 10 including the dedicated-cylinder EGR system 60, plasma ignition system 38 and the diverter valve 64 may be advantageously controlled via the controller 72 to achieve combustion stability over the entire engine speed/load operating range at high levels of EGR dilution. This includes operating the engine 10 in a dedicated-cylinder EGR mode by controlling the diverter valve 64 such that the residual exhaust gas 41 from the second subset of cylinders 19 are entrained and recirculated to the air intake system 14 for mixing and incorporation into the intake air charge. This includes operating the second subset of cylinders 19 that are associated with the dedicated-cylinder EGR system 60 at a rich air/fuel ratio to generate residual exhaust gas that includes hydrogen (H2) and carbon monoxide (CO) as additional species that can support enhanced in-cylinder flame propagation. The presence of H2 and CO enables a more dilute mixture in the first subset of cylinders 18. The use of the plasma igniters in the second subset of cylinders 19 can support combustion of a richer mixture than spark ignition system and thereby generate higher concentrations of H2 and CO in the exhaust, which by itself can enable higher dilution tolerance in the first subset of cylinders 18. Additionally, the radical generation events from the plasma igniters generates other radicals (e.g. Ozone, O radical) primarily in-cylinder prior to start of combustion and potentially in the exhaust as well. This can be implemented in both the first and second subsets of cylinders 18, 19. These radicals are expected to support combustion of a richer mixture in the second subset of cylinders 19 or combustion of a greater level of EGR diluted stoichiometric/lean mixture in the first subset of cylinders 18. This is an additional gain as compared to having a single plasma ignition event that starts the combustion in both first and second subset of cylinders.

The residual exhaust gas 41 from the second subset of cylinders 19 is mixed with the intake air and forms the feedstream that is supplied to the first subset of cylinders 18, which are operating at stoichiometry. It also forms the feedstream that is supplied to the second subset of cylinders 19 in one embodiment. The dilution level of the engine 10, when in a 4-cylinder configuration as shown, includes 25% residual exhaust gas, partly by the amount of exhaust generated and partly by a limit imposed by the ignition system 38. The dilution level of the engine 10 may be extended via overlapping of the intake and exhaust valve openings, thereby gaining additional fuel economy benefits. The reactivity enhancement plasma events are key enablers for expanding dilution tolerance. Dielectric barrier-discharge plasma igniters such as the plasma igniters 30 described herein are enabling technologies for dilute combustion engines, which may facilitate improved engine efficiency and reduced exhaust emissions. The concepts described herein facilitate implementation of dielectric barrier-discharge plasma igniters.

The controller 72 commands operation in the dedicated-cylinder EGR mode under specific engine operating conditions, including certain engine speed/load operating regions and engine operating temperatures. The certain engine speed/load operating regions are determined in relation to combustion stability and dilution tolerance of the engine 10. The certain engine speed/load operating regions indicate speed/load operating points at which the engine 10 is able to operate with combustion stability at or above a threshold level with a dilution level that is a result of the residual exhaust gas 41 being recirculated from the dedicated cylinder(s), wherein the plasma igniters 39 facilitate the in-cylinder combustion process. Such operation includes controlling the diverter valve 64 to a first position to divert all the residual exhaust gas 41 from the second subset of cylinders 19 to the air intake system 14.

When the engine 10 is operating outside of the predetermined operating regions, the diverter valve 64 can be controlled to a second position such that the residual exhaust gas 41 from the second subset of cylinders 19 is channeled away from the dedicated-cylinder EGR system 60, and is instead routed from the second exhaust manifold 62 to the first exhaust manifold 36. Under such operating conditions, the first and second subsets of cylinders 18, 19 may be controlled to operate at stoichiometry. Charge dilution from recirculated exhaust gases may instead be achieved via valve overlap, via a separate external EGR system (not shown), or via another suitable mechanism.

Figure 2:
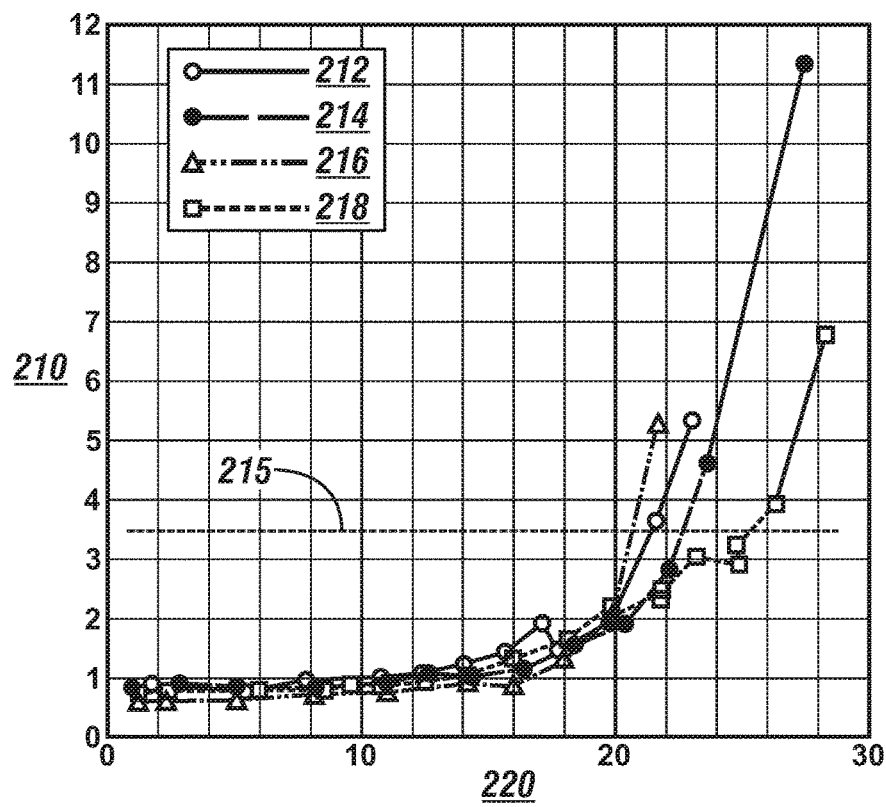
FIG. 2 graphically shows results associated with combustion stability in relation to EGR charge dilution, wherein the results are associated with operation of an embodiment of the internal combustion engine that is described with reference to FIG. 1, in comparison with operation of an embodiment of the internal combustion engine including an engine subassembly with a dedicated-cylinder exhaust gas recirculation (EGR) system that is employing a spark-ignition system, in accordance with the disclosure.

FIG. 2 graphically shows results associated with operation of an embodiment of the internal combustion engine that is described with reference to FIG. 1 that includes operation of a dedicated-cylinder exhaust gas recirculation (EGR) system employing an embodiment of the plasma ignition system. The results are shown in comparison with operation of an embodiment of the internal combustion engine with a dedicated-cylinder exhaust gas recirculation (EGR) system employing a high-energy inductive spark-ignition system. The results include combustion stability 210 (e.g., a coefficient of variation of a mean-effective pressure, or COV-IMEP), which is plotted in relation to % EGR dilution 220. In this example, the engine is operating at stoichiometric air/fuel ratio under low engine load conditions. Plotted results include combustion stability with increasing EGR dilution, including employing an inductive spark-ignition system operating at 60 mJ 212, employing an inductive spark-ignition system operating at 100 mJ 214, employing an embodiment of a barrier discharge plasma ignition system 216 and employing an embodiment of a corona discharge plasma ignition system 218. A maximum threshold for the combustion stability 215 is also shown. The results indicate that there is a marked increase in combustion stability when employing an embodiment of the barrier discharge plasma ignition system 214 under low load conditions at stoichiometry, as compared to the inductive spark-ignition system. As such, the data indicates enhanced dilution tolerance when the plasma ignition system is employed as compared to high-energy inductive spark ignition system.

Figure 3:
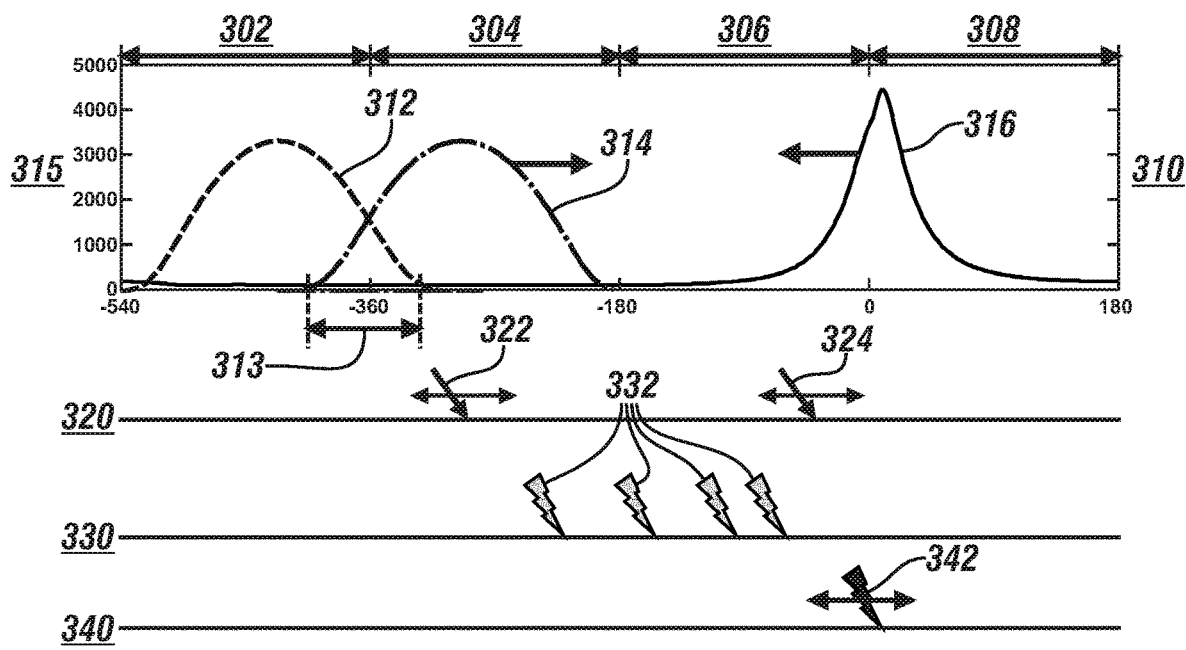
FIG. 3 graphically shows a timing chart associated with operation of an embodiment of the internal combustion engine that is described with reference to FIG. 1 over a single engine cycle, including timing of activation of a plasma igniter for reactivity enhancement and/or ignition of a cylinder charge, in accordance with the disclosure.

FIG. 3 graphically shows a timing chart associated with operation of an embodiment of the internal combustion engine 10 that is described with reference to FIGS. 1 and 2 over a single engine cycle, including exhaust, intake, compression, and expansion strokes 302, 304, 306 and 308, respectively. This graph includes timing of operation of the plasma igniter 39 for reactivity enhancement and/or combustion ignition. Engine operation data includes valve lift and timing (mm) 315, including exhaust valve lift 312 and intake valve lift 314, which are shown in relation to the corresponding exhaust stroke 302 and intake stroke 304, respectively, and cylinder pressure 310. A period of positive valve overlap 313 is indicated. The concepts described herein also apply to control routines that include negative valve overlap conditions. Engine data also includes the in-cylinder pressure 316, which peaks at the beginning of the expansion stroke 308. Engine control data includes fuel injection events 320 that are injected into the combustion chamber 15. As shown, there is a first fuel injection event 322 that preferably occurs and ends during the intake stroke 304, and an optional second fuel injection event 324 that preferably occurs and ends during the compression stroke 306. Engine control data also includes reactivity events 330 in the form of a plurality (four as shown) of plasma discharge events 332 that preferably occur at the end of the intake stroke 304 and/or during an early part of the compression stroke 306. Alternatively, or in addition, the engine control data includes ignition events 340 in the form of a plasma discharge event 342 that preferably occurs at the end of the compression stroke 306 to effect ignition of the cylinder charge. The reactivity enhancement plasma events is a key enabler for enhanced dilution tolerance.

In operation, the engine system 10 described with reference to FIG. 1 operates by monitoring an engine load, and determining fuel commands to supply fuel to each of the cylinders in response. This includes controlling the first subset of cylinders at stoichiometry or lean of stoichiometry, and controlling the second subset of cylinders at rich air/fuel ratio. The plasma ignition system associated with the second subset of cylinders 19 executes plasma discharge event to combust the cylinder charges in the second subset of cylinders 19 to generate power and form residual exhaust gas that includes radicals, such as H2, which provides reactivity enhancement. The residual exhaust gas is recirculated to the intake system via the dedicated-cylinder EGR system for introduction into the cylinder charges of the first subset of cylinders and, in one embodiment, introduction into the cylinder charges of the first subset of cylinders to initiate and complete the combustion process therein. The magnitude of the residual exhaust gas is controlled based upon dilution tolerance and combustion stability for the first subset of cylinders.

In one embodiment, the capability of enhanced dilution tolerance that is achieved from the use of the plasma ignition system may allow dilution employing an external EGR system (not shown) in addition to the dilution from the dedicated EGR system 60 to enhance combustion efficiency. Under certain operating conditions, the dilution limit is related to combustion stability associated with a rich combustion limit in the second subset of cylinders that are associated with the dedicated EGR system 60.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for operating a multi-cylinder internal combustion engine including an intake air system, a first subset of cylinders and a second subset of cylinders, a fuel injection system disposed to supply fuel to the cylinders, a plasma ignition system disposed only in the second subset of cylinders, and a dedicated-cylinder EGR system, the method comprising:

executing, via the fuel injection system, a first fuel injection event during an intake stroke to generate cylinder charges in the first subset of cylinders and in the second subset of cylinders, including employing intake air that is introduced into the air intake system, wherein the cylinder charges in the first subset of cylinders are controlled to a stoichiometric air/fuel ratio and wherein the cylinder charges in the second subset of cylinders are controlled to a rich air/fuel ratio;

executing, via the plasma ignition system, a plurality of first in-cylinder plasma discharges to ignite the cylinder charges only in the second subset of cylinders to form residual exhaust gas, wherein the first plasma discharges are executed at an end of the intake stroke and during a compression stroke of each combustion cycle; and recirculating the residual exhaust gas from the second subset of cylinders through the dedicated-cylinder EGR system to the intake air system for introduction into the intake air.

2. The method of claim 1, wherein the multi-cylinder internal combustion engine further includes a diverter valve that is disposed to control flow of the residual exhaust gas that is supplied from the second subset of cylinders, the method further comprising:
- determining an engine operating point; and
- controlling the diverter valve to channel the residual exhaust gas through the dedicated-cylinder EGR system to the air intake system for incorporation into the intake air when the engine operating point is associated with an operating region at which the engine is able to operate at an acceptable level of combustion stability.

3. The method of claim 2, further comprising controlling the diverter valve to channel the residual exhaust gas away from the dedicated-cylinder EGR system when the engine operating point is not associated with an operating region at which the engine is able to operate at an acceptable level of combustion stability.

4. The method of claim 1, further comprising a spark-ignition system being disposed in the first subset of cylinders, and wherein the method further comprises executing, via the spark-ignition system, spark discharges to combust the cylinder charges in the first subset of cylinders.

5. The method of claim 1, comprising executing, via the plasma ignition system, the plurality of first in-cylinder plasma discharges to combust the cylinder charges in the second subset of cylinders to generate radicals in the residual exhaust gas.

6. The method of claim 1, further comprising executing, via the fuel injection system, a second fuel injection event during the compression stroke, and executing, via the plasma ignition system, second in-cylinder plasma discharges subsequent to the second fuel injection events.

7. The method of claim 6, further comprising executing the second in-cylinder plasma discharges during the compression stroke.

8. The method of claim 6, wherein the second in-cylinder plasma discharges are executed at an end of the compression stroke.

9. The method of claim 6, wherein the second fuel injection event begins and ends during the compression stroke.

10. A multi-cylinder internal combustion engine system, comprising:
- an engine subassembly including an engine block defining a plurality of cylinders, an air intake system, a first exhaust manifold disposed to entrain exhaust gas from a first subset of the cylinders and a second exhaust manifold disposed to entrain exhaust gas from a second subset of the cylinders;
- a dedicated-cylinder exhaust gas recirculation (EGR) system including a runner fluidly connected between the second exhaust manifold and the air intake system;
- a plasma ignition system including a plurality of plasma igniters that are associated with only the second subset of the cylinders, wherein each of the plasma igniters has a tip portion that is disposed in one of the second subset of cylinders;
- a spark-ignition system disposed only in the first subset of cylinders; and
- a controller operatively connected to the internal combustion engine including the plasma ignition system and the spark ignition system, the controller including an instruction set, the instruction set executable to operate the plasma ignition system to control the plasma igniters to execute plasma discharges in the second subset of cylinders, wherein the plasma discharges are executed at an end of an intake stroke and during a compression stroke of each combustion cycle, and execute, via the spark ignition system, spark discharges to combust cylinder charges in the first subset of cylinders.

11. The engine system of claim 10, further comprising a fuel injection system including a plurality of fuel injectors that are disposed to supply fuel to the cylinders, wherein the plurality of fuel injectors includes a first subset of fuel injectors that are disposed to supply fuel to the first subset of cylinders and a second subset of fuel injectors that are disposed to supply fuel to the second subset of cylinders;
- wherein the controller is operatively connected to the fuel injection system, the controller including an instruction set, the instruction set executable to:
  - control the first subset of fuel injectors to operate the first subset of cylinders at an air/fuel ratio that is at stoichiometry, and
  - control the second subset of fuel injectors to operate the second subset of cylinders at a rich air/fuel ratio.

12. The engine system of claim 10, further comprising a diverter valve coupled between the first exhaust manifold, the second exhaust manifold and the dedicated-cylinder EGR system, wherein the diverter valve is disposed to control flow of residual exhaust gas that is supplied from the second subset of cylinders, wherein the controller is operatively connected to the diverter valve, wherein the instruction set is executable to:
- determine an engine operating point; and
- control the diverter valve to channel the residual exhaust gas through the dedicated-cylinder EGR system to the air intake system for incorporation into the intake air when the engine operating point is associated with an operating region at which the engine is able to operate at an acceptable level of combustion stability.

13. The engine system of claim 12, further comprising the instruction set executable to control the diverter valve to channel the residual exhaust gas away from the dedicated-cylinder EGR system when the engine operating point is not associated with an operating region at which the engine is able to operate at an acceptable level of combustion stability.

14. The engine system of claim 10, wherein the engine subassembly comprises an in-line cylinder configuration, and wherein the second subset of the cylinders that is associated with the dedicated-cylinder EGR system comprises a single one of the cylinders.

15. The engine system of claim 10, wherein the engine subassembly comprises an in-line cylinder configuration, and wherein the second subset of the cylinders that is associated with the dedicated-cylinder EGR system comprises a plurality of the cylinders.

16. The engine system of claim 10, wherein the engine subassembly comprises a V-configuration including a first bank of cylinders and a second bank of cylinders, and wherein the second subset of the cylinders comprises a single one of the cylinders on each of the first and second banks of cylinders.

17. The engine system of claim 10, wherein the engine subassembly comprises a V-configuration including a first bank of cylinders and a second bank of cylinders, and wherein the second subset of the cylinders comprises all of the cylinders on one of the first or second banks of cylinders.

18. The engine system of claim 10, wherein the plasma igniter is configured as a barrier-discharge device, a groundless barrier-discharge device, or a corona discharge plasma igniter.

19. The engine system of claim 10, further comprising a spark-ignition system including a plurality of spark plugs that are associated with the first subset of the cylinders, wherein each of the spark plugs has a tip portion that is disposed in one of the first subset of cylinders.

20. The engine system of claim 10, wherein the intake manifold includes a first throttle that is disposed to control intake airflow to the first and second subsets of the cylinders and a second throttle that is disposed to control intake airflow to only the second subset of the cylinders.

* * * * *